United States Patent
Bhowmick et al.

(10) Patent No.: US 10,475,231 B2
(45) Date of Patent: Nov. 12, 2019

(54) METHODS AND SYSTEMS FOR SURFACE FITTING BASED CHANGE DETECTION IN 3D POINT-CLOUD

(71) Applicant: Tata Consultancy Services Limited, Mumbai (IN)

(72) Inventors: Brojeshwar Bhowmick, Kolkata (IN); Swapna Agarwal, Kolkata (IN); Sanjana Sinha, Kolkata (IN); Balamuralidhar Purushothaman, Bangalore (IN); Apurbaa Mallik, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 7 days.

(21) Appl. No.: 15/898,160

(22) Filed: Feb. 15, 2018

(65) Prior Publication Data

US 2019/0080503 A1    Mar. 14, 2019

(30) Foreign Application Priority Data

Sep. 13, 2017 (IN) .............................. 201721032503

(51) Int. Cl.
| | |
|---|---|
| *G06T 15/06* | (2011.01) |
| *G06T 15/04* | (2011.01) |
| *G06T 17/00* | (2006.01) |
| *G06T 15/08* | (2011.01) |
| *G06T 7/254* | (2017.01) |

(52) U.S. Cl.
CPC .............. *G06T 15/04* (2013.01); *G06T 7/254* (2017.01); *G06T 15/08* (2013.01); *G06T 17/005* (2013.01); *G06T 2200/04* (2013.01); *G06T 2207/10028* (2013.01); *G06T 2207/20072* (2013.01)

(58) Field of Classification Search
CPC . G06T 2207/10028; G06T 2207/20072; G06T 7/254; G06T 15/08; G06T 2200/04; G06T 17/005; G06T 15/04
USPC ........................................................ 345/419
See application file for complete search history.

(56) References Cited

PUBLICATIONS

Zhang, Huaiqing, Chunxian Guo, Xiangfeng Su, and Chuanbao Zhu. "Measurement data fitting based on moving least squares method." Mathematical Problems in Engineering 2015 (2015).*
Golyanik V, Aziz Ali S, Stricker D. Gravitational approach for point set registration. InProceedings of the IEEE Conference on Computer Vision and Pattern Recognition 2016 (pp. 5802-5810).*

(Continued)

*Primary Examiner* — Phu K Nguyen
(74) *Attorney, Agent, or Firm* — Finnegan, Henderson, Farabow, Garrett & Dunner LLP

(57) ABSTRACT

Methods and systems for change detection utilizing three dimensional (3D) point-cloud processing are provided. The method includes detecting changes in the surface based on a surface fitting approach with a locally weighted Moving Least Squares (MLS) approximation. The method includes acquiring and comparing surface geometry of a reference point-cloud defining a reference surface and a template point-cloud defining a template surface at local regions or local surfaces using the surface fitting approach. The method provides effective change detection for both, rigid as well as non-rigid changes, reducing false detections due to presence of noise and is independent of factors such as texture or illumination of an object or scene being tracked for changed detection.

9 Claims, 13 Drawing Sheets

(56) References Cited

PUBLICATIONS

Golyanik V, Reis G, Taetz B, Strieker D. A framework for an accurate point cloud based registration of full 3D human body scans. In2017 Fifteenth IAPR International Conference on Machine Vision Applications (MVA) May 8, 2017 (pp. 67-72). IEEE.*

He, Ying, Bin Liang, Jun Yang, Shunzhi Li, and Jin He. "An iterative closest points algorithm for registration of 3D laser scanner point clouds with geometric features." Sensors 17, No. 8 (Jul. 2017): 1862.*

Weber, C.D. (2011). *Methods for Detection and Reconstruction of Sharp Features in Point Cloud Data* (Master's thesis). Retrieved from http://www-hagen.cs.uni-kl.de/wp-content/uploads/project/79.pdf.

Palma, G. et al. (2015). "Detection of geometric temporal changes in point clouds," *Computer Graphics forum*, vol. 0, No. 0; pp. 1-13.

Deschaud, J-E. et al. "A Fast and Accurate Plane Detection Algorithm for Large Noisy Point Clouds Using Filtered Normals and Voxel Growing," *Proceedings of the 5th International Symposium on 3D Data Processing, Visualization and Transmission (3DPVT '10)*, May 17-20, 2010, Paris, France; 9 pages.

Gruen, A. et al. (May 2005). "Least Squares 3D Surface Matching," *ISPRS Journal of Photogrammetry and Remote Sensing*, vol. 59, issue 3; pp. 151-174.

Golla, T. et al. "Real-time Point Cloud Compression," *2015 IEEE/RSJ International Conference on Intelligent Robots and Systems (IROS)*, Sep. 28-Oct. 2, 2015, Hamburg, Germany; 6 pages.

Wu, J. et al. (Aug. 2004). "Optimized Sub-Sampling of Point Sets for Surface Splatting," *Computer Graphics forum*, vol. 23, No. 3; pp. 643-652.

Hackel, T. et al. (2016). "Fast semantic segmentation of 3D point clouds with strongly varying density," *ISPRS Annals of Photogrammetry, Remote Sensing & Spatial Information Sciences*, vol. 3, No. 3; 8 pages.

\* cited by examiner

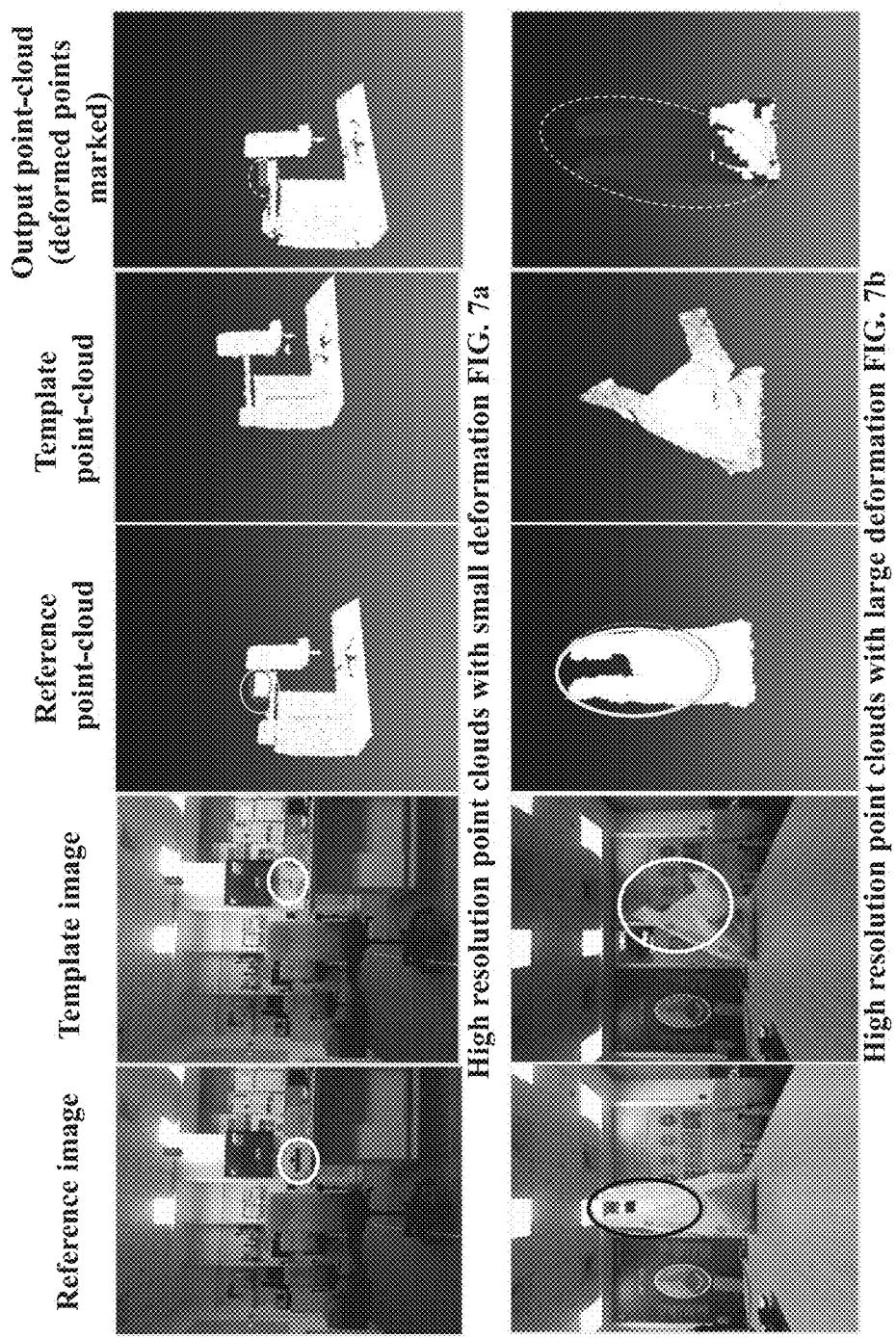

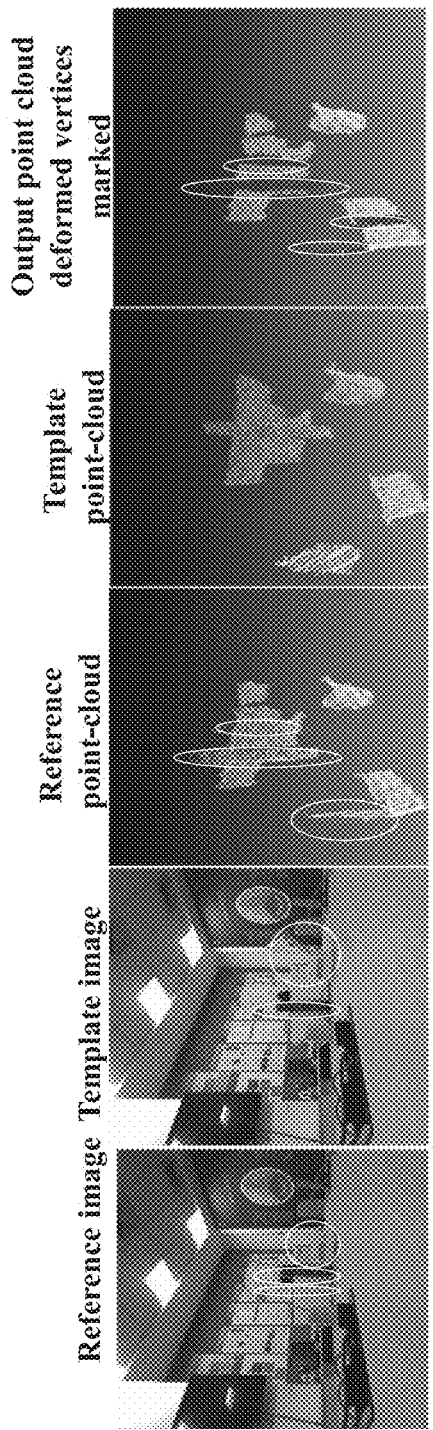

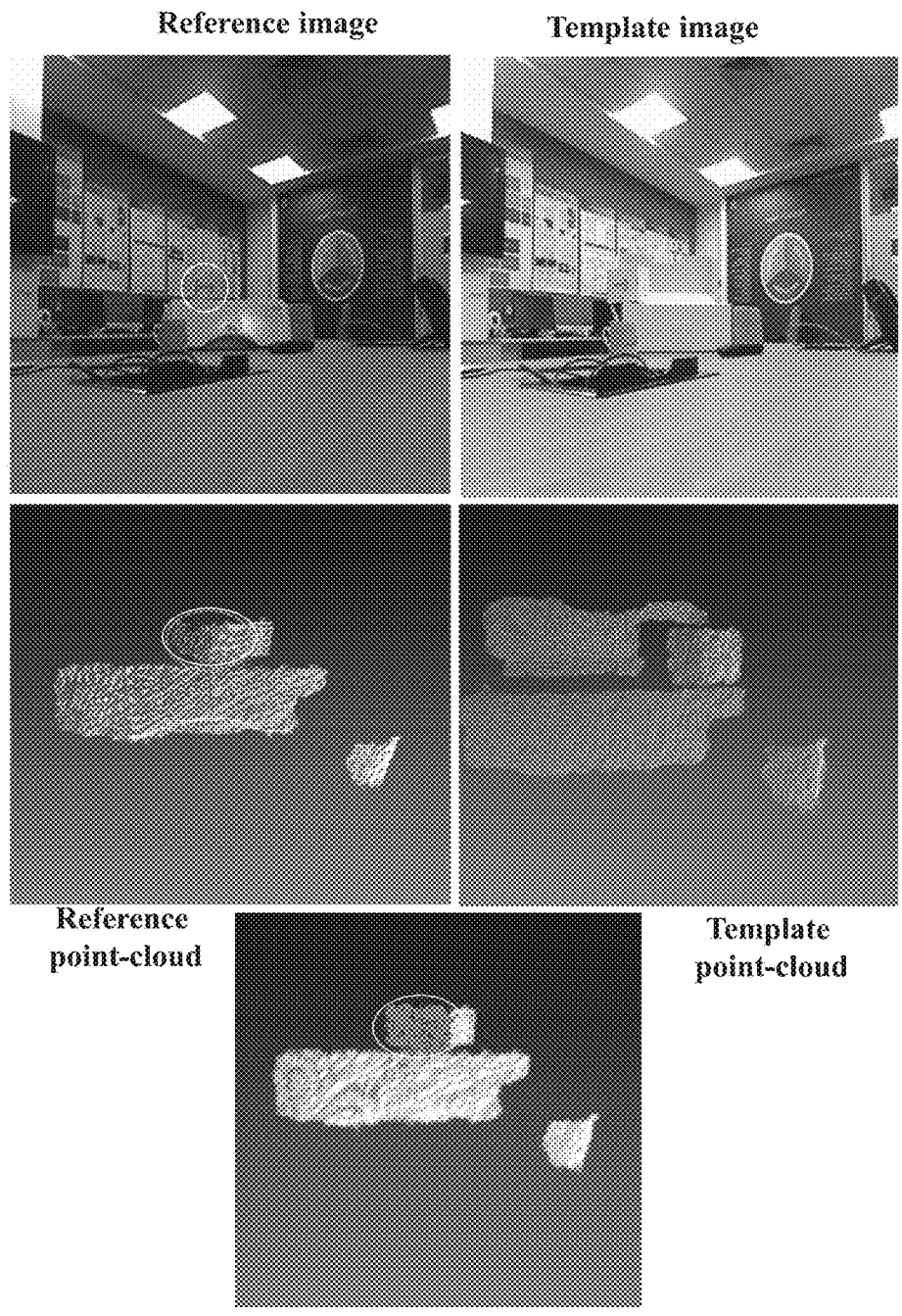
Low resolution point clouds with large deformation FIG. 7d

METHODS AND SYSTEMS FOR SURFACE FITTING BASED CHANGE DETECTION IN 3D POINT-CLOUD

CROSS-REFERENCE TO RELATED APPLICATIONS AND PRIORITY

This application takes priority from the Indian filed application no. 201721032503 filed on 13 Sep. 2017 the entirety of which is hereby incorporated by reference.

DESCRIPTION

Technical Field

The disclosure herein generally relates to field of three dimensional (3D) point-cloud processing and, more particularly to, surface fitting based change detection in 3D point-cloud.

Background

Three dimensional (3D) perception is gaining importance and finding extensive use for applications in robot navigation and perception, depth estimation, stereo vision, visual registration, in advanced driver assistance systems (ADAS) and the like. Tracking or detecting changes in objects or real world scenes is of enormous importance in such applications that include surveillance, remote sensing, product quality management and the like. Conventional image processing based approach for detecting changes in an object or scene of interest comprises comparing two image frames of the object of interest captured at different time instants. However, in the image processing based approach performance or accuracy of change detection is dependent on illumination variation present in the images being compared. With advent of point-cloud technology, 3D texture-less point-clouds representing the object or scene of interest are independent of illumination and contain depth information which is missing in the images. Thus, 3D point-cloud processing mechanisms are being widely used for change detection in wide variety of applications such as identifying buildings constructions and demolitions, change in forestation and the like. Traditional 3D change detection algorithms commonly consist of the steps including registration for point correspondence, estimation and modelling the registered point-clouds using various parameters to detect the change. An existing method for change detection using point-clouds utilizes earth mover's distance and graph-based matching algorithm. For large datasets, existing methods rely on Gaussian mixture model, which requires high computation due to the energy minimization algorithms used. Also, a user has to specify the number of Gaussians in advance. Another existing approach applies a 3D bounding box to registered point-clouds and then models a global density function by summing local density functions fitted to each point. Change in the point-cloud is estimated by thresholding the global density function. However, in this existing method the efficiency decreases when the surfaces are not closed. Further, existing methods face challenges in detecting change in non-rigid objects, mainly due to registration errors, difference in density between a source point-cloud and a target point-cloud, sensor noise, sensitivity of the detection method to small changes and similar other factors. Limitations of the existing point-cloud based change detection mechanisms effectively reduce accuracy in detecting the changes. The reduced accuracy may be critical in applications such as product quality assessment that demand higher accuracy.

SUMMARY

Embodiments of the present disclosure present technological improvements as solutions to one or more of the above-mentioned technical problems recognized by the inventors in conventional systems. For example, in one embodiment, a method for change detection in a surface represented by 3D point-cloud is provided. The method comprises acquiring a reference point-cloud defining a reference surface and a template point-cloud defining a template surface. The reference point-cloud and the template point-cloud correspond to the 3D point-cloud of the surface acquired at different time instances. Further, the method comprises aligning the template surface with the reference surface by performing registration of the template point-cloud and the reference point-cloud. The registration of the reference point-cloud and the template point-cloud is based on shape similarity based constraints. Further, the method comprises equalizing point density of the registered reference point-cloud and the registered template point-cloud by performing subsampling to provide a processed reference point-cloud and a processed template point-cloud. Further, the method comprises reducing noise from the processed reference point-cloud and the processed template point-cloud by estimating a smooth reference surface and a smooth template surface using a locally weighted Moving Least Squares (MLS) approximation. Further, the method comprises voxelizing the smooth reference surface to generate a plurality of reference voxels and the smooth template surface to generate a plurality of template voxels. Each reference voxel is defined by a plurality of reference vertices and each template voxel is defined by a plurality of template vertices. Furthermore, the method comprises determining a corresponding reference vertex for every template vertex of each template voxel using a k-dimensional (kd)-tree. The kd-tree is set with the plurality of reference vertices of a reference voxel. Furthermore, the method comprises determining vertex distance between every template vertex and the determined corresponding reference vertex, wherein the determined vertex distance above a predefined vertex distance threshold is indicative of the change in the surface represented by the 3D-point-cloud.

In another aspect, a system for change detection in a surface represented by 3D point-cloud, wherein the system comprises a memory (204) operatively coupled to one or more hardware processors (202) and configured to store instructions configured for execution by the one or more hardware processors (202). Further, the system comprises a registration module (212) is configured to acquire a reference point-cloud defining a reference surface and a template point-cloud defining a template surface. The reference point-cloud and the template point-cloud correspond to the 3D point-cloud of the surface acquired at different time instances. Further, the registration module is configured to align the template surface with the reference surface by performing registration of the template point-cloud and the reference point-cloud, wherein the registration of the reference point-cloud and the template point-cloud is based on shape similarity based constraints. Further, a subsampling module is configured to equalize point density of the registered reference point-cloud and the registered template point-cloud by performing subsampling to provide a processed reference point-cloud and a processed template point-cloud. Furthermore, a change detection module configured to reduce noise from the processed reference point-cloud and the processed template point-cloud by estimating a smooth reference surface and a smooth template surface using a locally weighted Moving Least Squares (MLS) approximation. Further, the change detection module is configured to voxelize the smooth reference surface to generate a plurality of reference voxels and the smooth template surface to generate a plurality of template voxels. Each reference voxel is defined by a plurality of reference vertices and each template voxel is defined by a plurality of template vertices. Further, the change detection module is configured to determine a corresponding reference vertex for every template vertex of each template voxel using the kd-tree, wherein the kd-tree is set with the plurality of reference vertices of a reference voxel. Furthermore, the change detection module is configured to determine vertex distance between every template vertex and the determined corresponding reference vertex, wherein the determined vertex distance above a predefined vertex distance threshold is indicative of the change in the surface represented by the 3D-point-cloud.

In yet another aspect, a non-transitory computer readable medium is provided. The non-transitory computer-readable medium stores instructions which, when executed by a hardware processor, cause the hardware processor to perform acts comprising acquiring a reference point-cloud defining a reference surface and a template point-cloud defining a template surface. The reference point-cloud and the template point-cloud correspond to the 3D point-cloud of the surface acquired at different time instances. Further, the acts comprise aligning the template surface with the reference surface by performing registration of the template point-cloud and the reference point-cloud. The registration of the reference point-cloud and the template point-cloud is based on shape similarity based constraints. Further, the acts comprise equalizing point density of the registered reference point-cloud and the registered template point-cloud by performing subsampling to provide a processed reference point-cloud and a processed template point-cloud. Further, the acts comprise reducing noise from the processed reference point-cloud and the processed template point-cloud by estimating a smooth reference surface and a smooth template surface using a locally weighted Moving Least Squares (MLS) approximation. Further, the acts comprise voxelizing the smooth reference surface to generate a plurality of reference voxels and the smooth template surface to generate a plurality of template voxels. Each reference voxel is defined by a plurality of reference vertices and each template voxel is defined by a plurality of template vertices. Furthermore, the acts comprise determining a corresponding reference vertex for every template vertex of each template voxel using a kd-tree. The kd-tree is set with the plurality of reference vertices of a reference voxel. Furthermore, the acts comprise determining vertex distance between every template vertex and the determined corresponding reference vertex, wherein the determined vertex distance above a predefined vertex distance threshold is indicative of the change in the surface represented by the 3D-point-cloud.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 7a through 7d illustrate examples providing comparison of change detection results for varying resolution point-clouds acquired for objects or scenes of interest, in accordance with some embodiments of the present disclosure;

Figure 1:
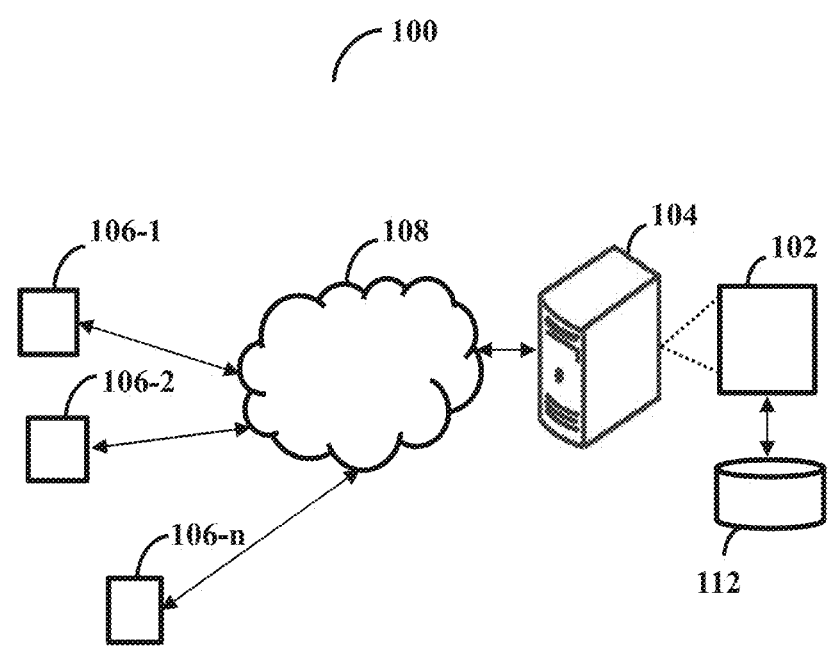
FIG. 1 illustrates an example network environment implementing a system for surface fitting based change detection for a surface represented by three dimensional (3D) point-cloud, according to some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments herein provide methods and systems for change detection utilizing three dimensional (3D) point-cloud processing approach. The change detection based on a surface fitting approach with a locally weighted Moving Least Squares (MLS) approximation enables identifying any changes or deformation in a surface represented by 3D point-cloud, wherein the 3D point-cloud may be acquired for an object of interest, scene of interest or the like. The method includes acquiring and comparing surface geometry of a reference point-cloud defining a reference surface and a template point-cloud defining a template surface at local regions or local surfaces using the surface fitting approach.

The reference point-cloud provides a source point-cloud and the template point-cloud provides a target point-cloud, which correspond to the 3D point-clouds of the surface, acquired at different time instances and compared for change detection.

The method provides effective change detection for both, rigid as well as non-rigid deformation or changes in surfaces of objects or scenes of interest. Furthermore, the construction of local surfaces to provide a smooth manifold using MLS eliminates effect of noise, effectively reducing false change detections or deformations due to presence of noise in the acquired 3D-point-clouds. The 3D-point-cloud is independent of factors such as texture, illumination of the object or scene being tracked for changed detection, hence the method proposed eliminates dependency on texture or illumination for change detection. Thus, the method provides a robust change detection mechanism. As compared to existing 3D-point-cloud change detection algorithms that rely on point coordinates of the points in the 3D point-clouds, the surface geometry approximation used by the method provides better detection for smaller changes or deformation, effectively providing higher accuracy in detection of changes occurred. Furthermore, the method provides reliable change detection even when there are variations in density between the reference point-cloud and the template point-cloud. The method may be used in applications such as surveillance, remote sensing, product quality assessment and the like that demand higher accuracy.

Referring now to the drawings, and more particularly to FIG. 1 through FIG. 10, where similar reference characters denote corresponding features consistently throughout the figures, there are shown preferred embodiments and these embodiments are described in the context of the following exemplary system and/or method.

FIG. 1 illustrates an example network environment 100 implementing a system 102 for surface fitting based change detection for a surface represented by the 3D point-cloud, according to some embodiments of the present disclosure. The network environment 100 includes a plurality of data sources 106-1 through 106-$n$ that are source of one or more point-cloud sets acquired. The data sources may receive the point-cloud sets acquired from a plurality of 3D-scanners such as Kinect® or aerial Light Detection And Ranging (LiDAR) laser scanners or the like. The data sources 106-1 to 106-$n$ may be connected to a computing device 104 through a network 108. The computing device 104 may include the system 102, which is configured to perform surface fitting based change detection for the surface represented by 3D point-cloud. In an example embodiment, the system 102 may be embodied in the computing device 102 (not shown). In example embodiment the system 102 may be in direct communication with the computing device 104, as depicted in FIG. 1.

In an embodiment, the network 108 may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 108 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the system 102 through communication links.

In an embodiment, the computing device 104, which implements the system 102 can be a laptop or other portable computer, and a desktop computer and the like. The system 102 may also be implemented in a workstation, a mainframe computer, a server, and a network server. In an embodiment, the system may be coupled to a data repository, for example, a repository 112. The repository 112, may store the point-clouds acquired from the plurality of data sources 106-1 through 106-$n$ such as reference cloud-points and template cloud points for one or more objects/scenes being tracked for change detection or deformation. Further, the repository 112 may also store other data such as the intermediate data generated during processing of the reference point-cloud and the template point-cloud to detect the deformation or change. The repository 112 may also hold output point-clouds, which indicate the detected change or deformation.

In an alternate embodiment, the data repository 112 may be internal to the system 102. The components and functionalities of system 102 are described further in detail with reference to FIG. 2 and FIG. 3.

Figure 2:
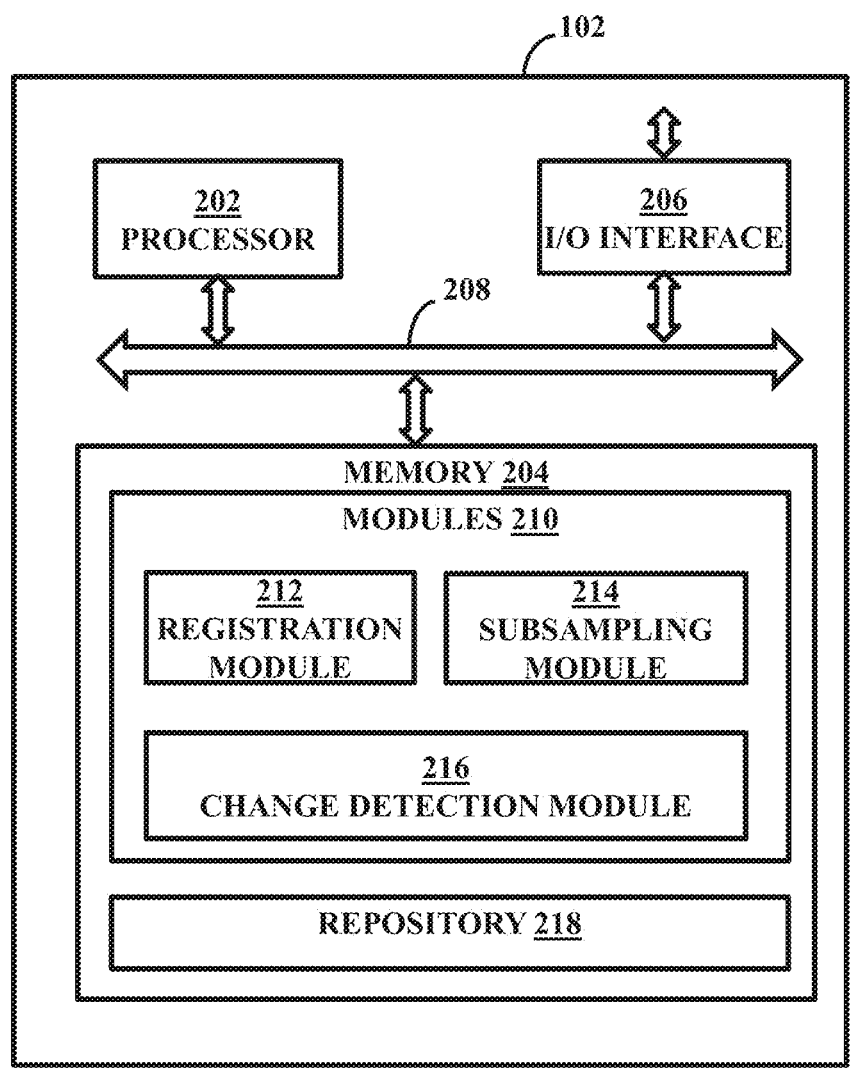
FIG. 2 illustrates a functional block diagram of the system, according to some embodiments of the present disclosure.

FIG. 2 is a functional block diagram of the system 102, according to some embodiments of the present disclosure. The system 102 includes or is otherwise in communication with one or more hardware processors such as a processor 202, at least one memory such as a memory 204, and an I/O interface 206. The processor 202 (hardware processor), the memory 204, and the I/O interface 206 may be coupled by a system bus such as a system bus 208 or a similar mechanism.

The memory 204 further may include modules 210. In an embodiment, the modules 210 include a registration module 212, a subsampling module 214, a change detection module 216 and other modules (not shown) for implementing functions of the system 102. In an embodiment, the registration module 212, the subsampling module 214, the change detection module 216 may be integrated into a single module. In an embodiment, the module 210 can be an Integrated Circuit (IC), external to the memory 204, implemented using a Field-Programmable Gate Array (FPGA) or an Application-Specific Integrated Circuit (ASIC). The names of the modules of functional block in the memory module 210 referred herein, are used for better explanation and are not a limitation. Further, the memory 204 includes a repository 218.

The hardware processor 202 may be implemented as one or more multicore processors, a microprocessors, microcomputers, microcontrollers, digital signal processors, central processing units, state machines, logic circuitries, and/or any devices that manipulate data based on operational instructions. Among other capabilities, the hardware processor 202 is configured to fetch and execute computer-readable instructions stored in the memory 204 and communicate with the modules 210, external to the memory 204, for triggering execution of functions to be implemented by the modules 210. In an embodiment, for detecting the changes in the surface represented by 3D point-cloud the registration module 212 is configured to acquire the reference point-cloud that defines a reference surface and the template point-cloud that defines a template surface for the object or scene of interest. The reference point-cloud and the template point-cloud correspond to the 3D point-cloud of the surface acquired at different time instances. These point-clouds are processed and compared to detect any change that may have occurred between two time instances the capture of the reference cloud and the template cloud. The registration module 212 is further configured to align the template surface with the reference surface by performing registration of the template point-cloud and the reference point-cloud. In an embodiment, the registration is based on shape similarity based constraints, explained in conjunction with flow diagram of FIG. 3a. Upon successful registration, the sampling module 216 is configured to equalize point density of the registered reference point-cloud and the registered template point-cloud. The equalization is performed by subsampling process to provide a processed reference point-cloud and a processed template point-cloud. The subsampling is explained in conjunction with FIG. 3a. Further, the change detection module 216 is configured to reduce noise from the processed reference point-cloud and the processed template point-cloud. The noise reduction is performed by estimating a smooth reference surface and a smooth template surface using the locally weighted MLS approximation. The smoothening is explained in conjunction with FIG. 3a and FIG. 3b. Upon processing for the noise reduction, the change detection module 216 is configured to voxelize the smooth reference surface to generate a plurality of reference voxels and voxelize the smooth template surface to generate a plurality of template voxels. Each reference voxel is defined by a plurality of reference vertices and each template voxel is defined by a plurality of template vertices. Further, the change detection module 216 is configured to determine a corresponding reference vertex for every template vertex of each template voxel using a k-dimensional tree (kd-tree). The kd-tree is set with the plurality of reference vertices of a reference voxel. Furthermore, the change detection module 216 is configured to determine a vertex distance between every template vertex and the determined corresponding reference vertex. If the determined vertex distance is above a predefined vertex distance threshold, this indicates occurrence of change or deformation in the surface being tracked. The threshold may be set equal to a search radius (neighborhood radius). For example, for a bunny point-cloud, it is set to 0.09 meters. An output point-cloud is generated to indicate the change detected in the template point-cloud with respect to the reference point-cloud.

The I/O interface 206 in the system 102 may include a variety of software and hardware interfaces, for example, a web interface, a graphical user interface to display the change detection results as depicted in FIGS. 4 through 10. The interfaces 206 may include a variety of software and hardware interfaces, for example, interfaces for peripheral device(s), such as a keyboard, a mouse, an external memory, a camera device, and a printer and a display. Further, the interfaces 206 may enable the system 102 to communicate with other devices, such as the computing device 104, web servers and external databases (repository 112). The interfaces 206 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 206 may include one or more ports for connecting a number of computing systems with one another or to another server computer. The I/O interface 206 may include one or more ports for connecting a number of devices to one another or to another server.

The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Further, the modules 210 may include routines, programs, objects, components, data structures, and so on, which perform particular tasks or implement particular abstract data types. The modules 210 may include computer-readable instructions that supplement applications or functions performed by the system 102.

The repository 218 may store the point-clouds, received from the plurality of data sources 106-1 through 106-n. Further, the repository 218 may store data such as the registered point-clouds, the sub-sampled point-clouds, any intermediate processed point-clouds, output point-cloud indicating the change detection results and the like. Further, the other data that is processed, received, or generated as a result of the execution of one or more modules in the module(s) 210 may also be stored in the repository 218.

Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 3A:
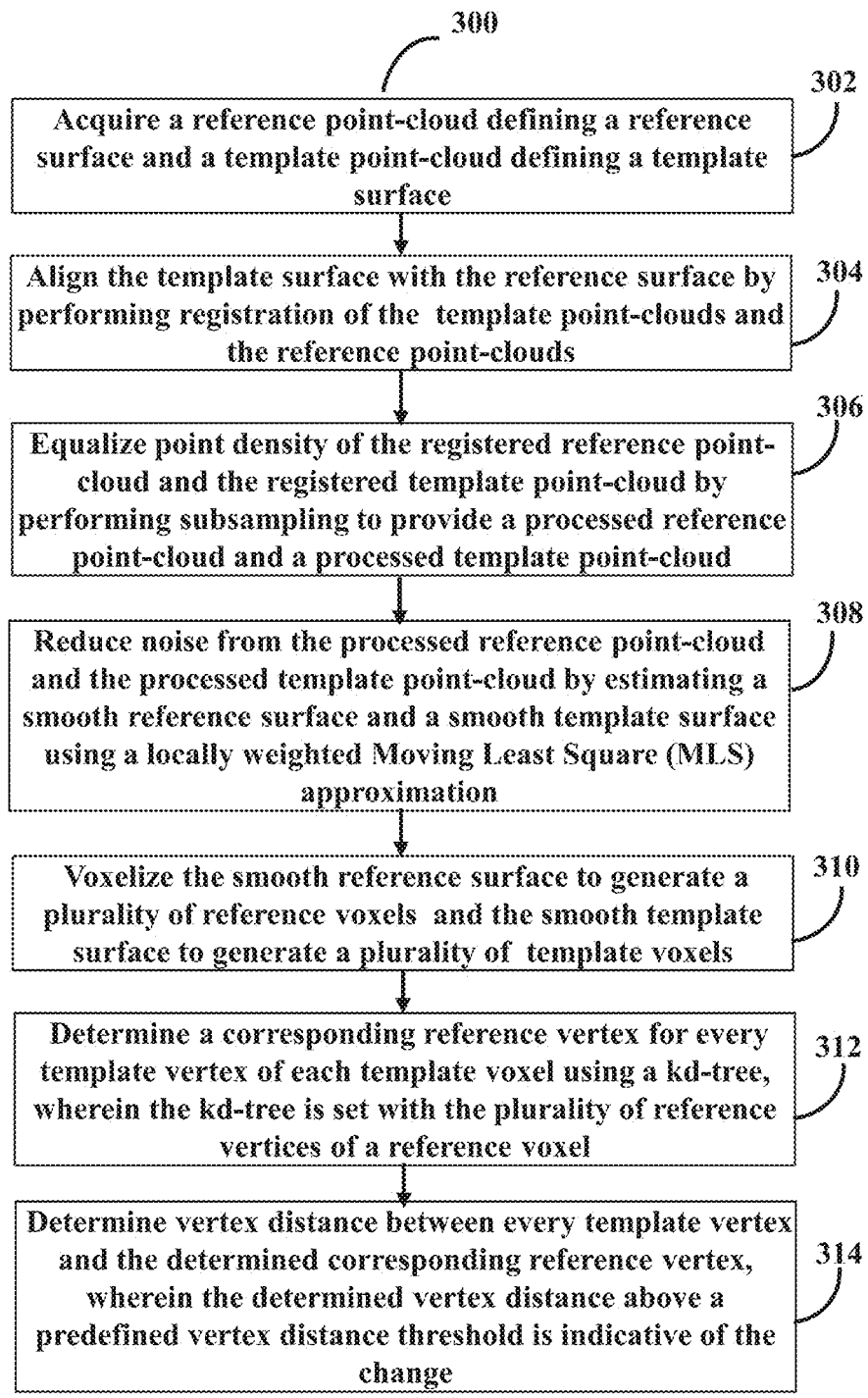
FIG. 3a is a flow diagram illustrating a method for surface fitting based change detection for the surface represented by 3D point-cloud, in accordance with some embodiments of the present disclosure.

FIG. 3a is a flow diagram illustrating a method 300 for surface fitting based change detection in the surface represented by the 3D point-cloud, in accordance with some embodiments of the present disclosure.

To detect changes in the surface represented by 3D point-cloud of the object of interest or the scene of interest, in an embodiment, at step 302, the method 300 includes allowing the registration module 212 to acquire the reference point-cloud and the template point-cloud of the object or the scene of interest. The reference point-cloud and the template point-cloud correspond to the 3D point-cloud of the surface acquired at different time instances, which are processed and compared with each other for detecting any change that may have occurred between the capture of the reference cloud and the template cloud. At step 304, the method 300 includes allowing the registration module 212 to align the template surface with the reference surface by performing registration of the template point-cloud and the reference point-cloud. In an embodiment, the registration is based on shape similarity based constraints and the registration process is explained below.

The template point-cloud may be alternatively referred as template, while the reference point-cloud may be alternatively referred as reference. The template is translated, rotated and scaled such that it aligns with the reference. For estimating the translation, a framework is assumed where each point (say, Xj) of the reference attracts each point (say, Yi) of the template by a force say, $f^{Xj,Yi}$. Since the alignment should be based on shape, the framework is designed as below:

$$f^{Xj,Yi} \alpha s^{Xj,Yi} \quad (1)$$

Where, $s^{Xj,Yi}$ represents a measure of shape of similarity between the surfaces defined by the two neighborhoods centered at Xj and Yi respectively. The term $s^{Xj,Yi}$ is defined as below:

$$s^{Xj,Yi} = \exp\left(\frac{|a^{Xj} - a^{Yi}|^2}{\sigma^2}\right) \quad (2)$$

In equation (2) $\alpha^{Xj}$ and $\sigma$ represent the curvature of the surface defined by the neighborhood centered at Xj and the spread of the Radial Basis Function (RBF) as defined in (2) respectively. Curvature is used as a measure of representing shape. For fast convergence, it is expected that the movement of the template takes larger steps if the distance between the template and the reference is higher. When the distance is smaller, it is expected to take smaller steps to ensure fine-tuning. So, another constraint is introduce on $f^{Xj,Yi}$ as follows.

$$f^{Xj,Yi} \alpha \|r^{Yi} - r^{Xj}\| n_{ij} \quad (3)$$

Where, $r^{Yi}$ represents the absolute coordinates of Yi. The formula governing the total force ($f^{Yi}$) applied on Yi by all the points in the reference is given by $$f^{Yi} = -G \sum_{j=1}^{N} (s^{Xj,Yi}) \|r^{Yi} - r^{Xj}\| n_{ij} \quad (4)$$

Where, G is a constant and $n_{i,j}$ is a unit vector in the direction of force. If the template has total M number of points then the total force (say, f) applied on the template is $f = \sum_{i=1}^{M} f^{Yi}$. The template as a rigid body translates by say, d units under the influence of f following Newton's second law of motion. According to this law, the acceleration of the template is proportional to f divided by the mass of the template. The mass of each point is assumed as one and the initial velocity to be zero.

In an embodiment, rotation matrix R is estimated based on the Kabsch algorithm. Let Y and $Y_D$ represent the mean subtracted M×3 matrices representing M coordinates of the template point-cloud before and after translation following equation (6). Let $\hat{C} = Y_D^T Y$ represent a cross-covariance matrix. In an embodiment, the rotation matrix R is estimated using Singular Value Decomposition (SVD) of $\hat{C}$. After SVD $\hat{C} = \hat{U}\hat{S}\hat{V}^T$ and let $\acute{s} = \text{sign}(\det(\hat{V}\hat{U}^T))$. Then, $$R = \hat{V} \begin{bmatrix} 1 & 0 & 0 \\ 0 & 1 & 0 \\ 0 & 0 & \acute{s} \end{bmatrix} \hat{U}^T \quad (5)$$

Let eX and eY represent the largest eigen-values of the covariance matrix of the reference and the template point-clouds respectively. The scaling factor required for registration is given by c=eX/eY. The template is updated for scaling, rotation and translation iteratively using the following formula to register it with the reference.

$$Y(t+1) = \acute{Y}R + \mu + d \quad (6)$$

Where, Y' represents the M×3 matrix of the template point-cloud after scaling and $\mu$ is M×3 matrix with the mean coordinates of the points copied in each row. The shape constraint based registration process utilized is as described in the patent application number 201721031135 filed at the Indian Patent Office and tilted SYSTEMS AND METHODS FOR SHAPE CONSTRAINED 3D POINT CLOUD REGISTRATION.

Upon successful registration, at step 306, the method 300 includes allowing the subsampling module 216 to equalize point density of the registered reference point-cloud and the registered template point-cloud. The equalization is performed by subsampling process to provide a processed reference point-cloud and a processed template point-cloud. The subsampling comprises identifying a first point-cloud and a second point-cloud among the reference point-cloud and the template point-cloud for sub-sampling. The first point-cloud comprises higher density of points and the second point-cloud comprises lower density of points. Further, sampling comprises assigning a parameter to each point of the first point-cloud. The parameter is initialized to zero value indicating that the point is not required to be sampled. Further, the subsampling includes setting each point of the first point-cloud in the kd-tree, wherein each point is defined by 3D-coordinates. Furthermore, the subsampling comprises identifying a closest point from the first point-cloud for each point of the second point-cloud. The closest point is identified from the kd-tree and is defined by 3D-coordinates. Furthermore, the determining a sub-sampling distance between the each point of the second point-cloud and the corresponding closest point from the first point-cloud. Thereafter, sampling comprises generating a sub-sampled first point-cloud by retaining the closest point from the first point-cloud in the sub-sampled first point-cloud if the determined sub-sampling distance is below a threshold t1 or above a predefined subsampling threshold t2, wherein t2 is greater than t1. The sampling process is detailed below.

Significant variation of density increases the chances of false positives in change detection. Therefore, the densities of the two point-clouds need to be consistent. The reference and the template point-clouds may have varying point densities with N and M vertices respectively. The assumption, for explanation herein, that N<M. The higher density point-cloud (first point-cloud) among the reference point-cloud and the template point-cloud is subsampled and the lower density point-cloud (second point-cloud) is retained with the original point density. Every vertex of the template is assigned the parameter b. The parameter b indicates if the vertex is to be included in the subsampled point-cloud for further processing. Initially, the b parameter for all the vertices of the template is set to 0, indicative of non-inclusion of the parameter in the subsampled point-cloud (first point-cloud post subsampling process). Then the vertices (represented by the 3D co-ordinates) of the template are set in a kd-tree. For every vertex (point) of the reference, the closest vertex (closest point) of the template is selected from the kd-tree and a subsampling distance is determined between them. If the subsampling distance between the 3D coordinates of the two vertices is either below the predefined subsampling threshold t1 or above the predefined subsampling threshold t2, wherein t2 is greater than t1, then the selected vertex of the template (first point-cloud) is included in the sub-sampled point-cloud and b=1 is set. For example, t1=0.01 meters, t2=0.09 meters while the neighborhood radius is set to 0.09 meters. The vertices of the template in the kd-tree, whose b parameter is set to 1, form the sub-sampled point-cloud (first point-cloud post subsampling process). There may be some vertices in the template that may have undergone change with respect to the vertices in the reference. For retaining those vertices, a kd-tree is set with the vertices of the reference and compared with vertices of the template whose b is still set to 0. If the distance between the two vertices is greater than a threshold (such as a user provided threshold) for example, t2=0.9 meters, then the input vertex is also included in the sub-sampled template point-cloud. If N>M, then the reference is sub-sampled in the similar manner as described herein, wherein the reference point-cloud is now the first point-cloud.

Even though subsampling process is performed to approximate the two point densities that effectively reduces noise, the surfaces of the template and the reference may not be exactly the same even if there is no significant change/ deformation in the object or the scene being tracked or monitored. This is because of the incorporation of noise in the two point-clouds. To reduce such noise, at step 308, the method 300 includes allowing the change detection module 216 to estimate the smooth reference surface and the smooth template surface using the locally weighted MLS approximation. The MLS approximation comprises estimating a local reference surface for each point of the processed reference point-cloud and a local template surface for each point of the processed template point-cloud. Estimating the local reference surface and the local template surface comprises identifying local neighborhood comprising a plurality of neighbor points for each point of the processed reference point-cloud and each point of the processed template point-cloud. Further, identifying a local reference planar surface represented by the corresponding plurality of neighbor points and a local template planar surface represented by the corresponding plurality of neighbor points. The local reference planar surface and the local template planar surface is estimated such that the summation of the weighted distances between the plurality of neighbor points and projections of the plurality of neighbor points on the local reference surface and the local template surface is minimized. Further, the MLS approximation comprises projecting each point of the processed reference point-cloud on the corresponding local reference planar surface and each point of the processed template point-cloud on the corresponding local template planar surface. Each projected point from reference point-cloud is considered as origin of a local reference coordinate system and each projected point from template point-cloud is considered as origin of a local template coordinate system. Further, the MLS approximation comprises estimating, each of the local reference surface and the local template surface by a corresponding polynomial in two variables. The values of the two variables represent coordinates of corresponding projected point in terms of the local reference system. The corresponding polynomials approximate height of the plurality of neighbor points from the local reference planar surface and the local template planar surface by minimizing the differences between the actual height of the plurality of neighbor points from the local reference planar surface and the corresponding heights as approximated by the polynomial.

Figure 3B:
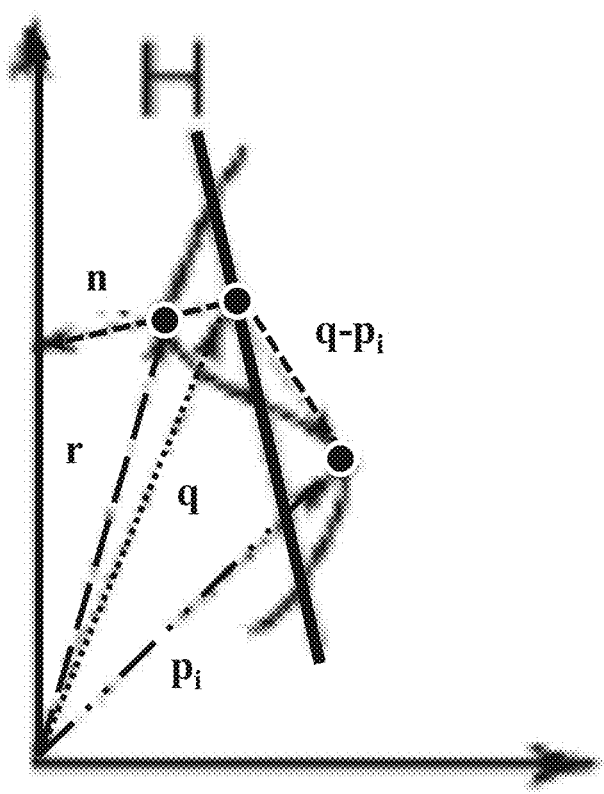
FIG. 3b is a graphical illustration of a Moving Least Square (MLS) based surface fitting mechanism, in accordance with some embodiments of the present disclosure.

The MLS approximation is explained in conjunction with the graphical representation in FIG. 3b. For each point say, r of the processed reference point-cloud and the processed template point-cloud, a local neighborhood centered at r is considered. A local planar surface for each point-cloud (a local reference planar surface and a local template planar surface), represented by the points (say pi) in that neighborhood is estimated such that the summation of the weighted distances between the points pi and their projections (say, qi) on the estimated local planar surface is minimized. Thus, for each point r of the point-cloud, represented in the quadrant depicted by horizontal (x-axis) and vertical (y-axis), the local planar surface is estimated and the point r is projected on the estimated surface. All the projected points form a smoothened surface manifold. This smoothening includes using differential geometry that enables approximation of any local surface by a function. The function for each local surface is represented with respect to a local plane or the local planar surface (used as reference). The plane is defined as $H=\{x| < n;\ x> -D=0;\ x \in R^3\}$, $n \in R^3$, $\|n\|=1$. Let q represent the projection of r onto H. Then H is found by minimizing the function below:

$$\Sigma_{i=1}^{N} <n, pi-q>^2 e(\|pi-q\|) \qquad (7)$$

Where, e is a monotonically decreasing function with positive values. The local minimum of function in equation (7) is found by setting q=r+tn with the smallest (t is a scalar) and a local tangent plane near r. The projection q of r on H is considered as the origin of the local reference co-ordinate system. With the local reference co-ordinate system a local surface is approximated by a polynomial in two variables: x and y where, $(x_i;\ y_i)$ represents the co-ordinates of qi in terms of the local reference system. So, the polynomial represented by say, $g(x_i,\ y_i)$ approximates hi where, hi=<n; (pi–q)> is the height of the point pi from H. This is achieved by minimizing the following equation:

$$\Sigma_{i=1}^{N} g(xi, yi-hi)^2 e(\|pi-q\|) \qquad (8)$$

Upon processing for the noise reduction, at step 310, the method 300 includes allowing the change detection module 216 to voxelize the smooth reference surface to generate the plurality of reference voxels and voxelize the smooth template surface to generate the plurality of template voxels. Each reference voxel is defined by the plurality of reference vertices and each template voxel is defined by the plurality of template vertices.

At step 312, the method 300 includes allowing the, the change detection module 216 to determine the corresponding reference vertex for every template vertex of each template voxel using a kd-tree. The kd-tree is set with the plurality of reference vertices of the reference voxel. At step 314, the method 300 includes allowing the change detection module 216 to determine the vertex distance between every template vertex and the determined corresponding reference vertex. If the determined vertex distance is above the predefined vertex distance threshold, this indicates occurrence of change or deformation in the surface being tracked. Thus, to facilitate comparison at local region, the template point-cloud and the reference point-cloud are divided into equal number of voxels. Let the corresponding voxels of the reference and the template have/and m number of vertices respectively. Each of the/and m vertices of the reference and the template respectively is now represented by the coefficients of the corresponding polynomial approximation. To detect change in the template with respect to the reference, the vertices belonging to the voxel of the template are set in a kd-tree. For every vertex in the corresponding voxel of the reference, the nearest neighbor vertex of the template is selected from the kd-tree. If the distance between the input vertex and the searched vertex is negligible, then the input vertex is said to be undistorted. Otherwise, it has undergone change in the template. Using similar process, change can be detected in the reference with respect to template as well.

Once the change is identified, the output point-cloud is generated to indicate the change in the template point-cloud with respect to the reference point-cloud and can be displayed. Examples of reference point-clouds, template point-clouds and the output point-clouds indicating the change detection results are depicted and explained in conjunction with FIGS. 4 through 10.

The illustrated steps of method 300 are set out to explain the exemplary embodiments shown, and it should be anticipated that ongoing technological development may change the manner in which particular functions are performed. These examples are presented herein for purposes of illustration, and not limitation.

Figure 4:
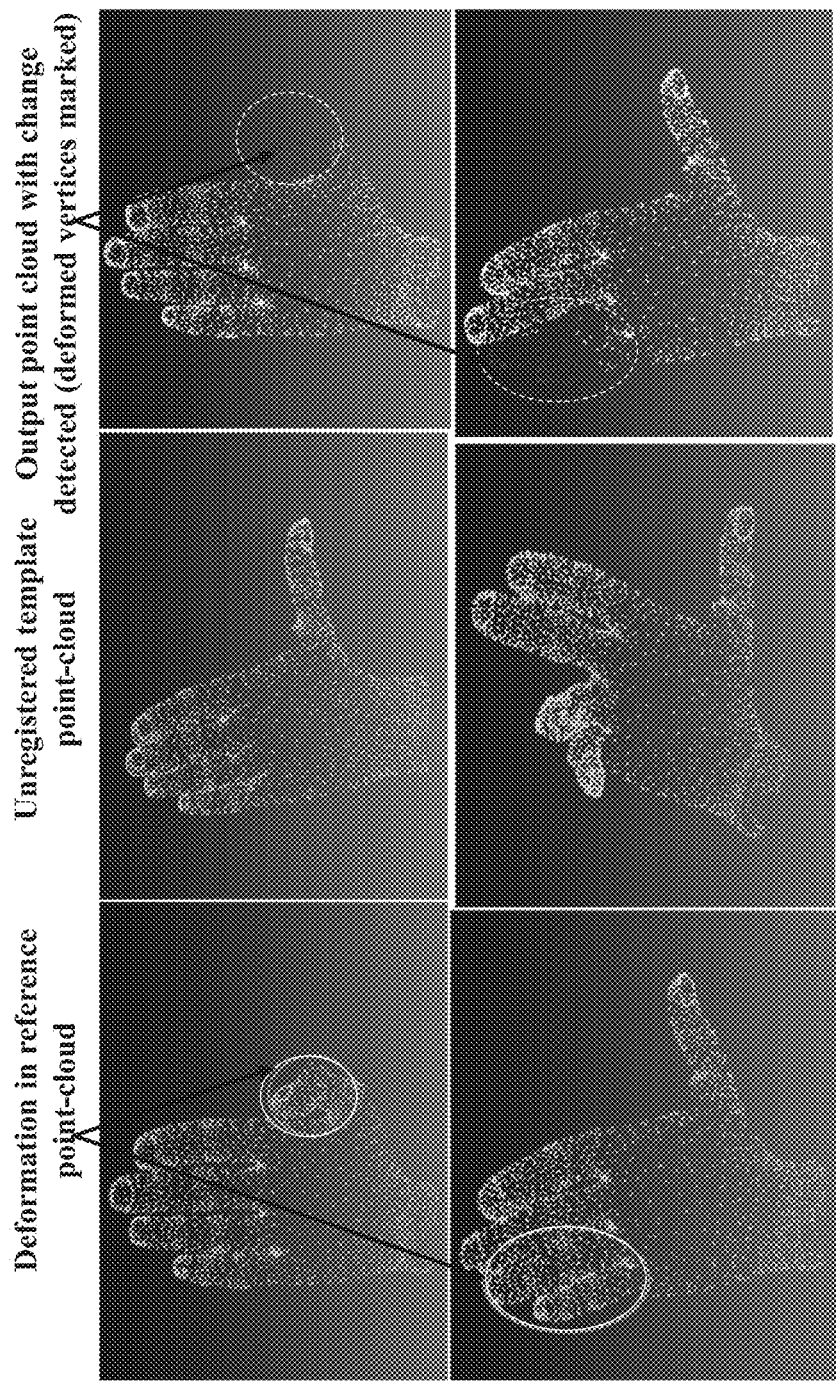
FIG. 4 and FIG. 5 are examples depicting changes detected with respect to a reference point-cloud and a template point-cloud acquired for example objects, in accordance with some embodiments of the present disclosure.
Figure 5:
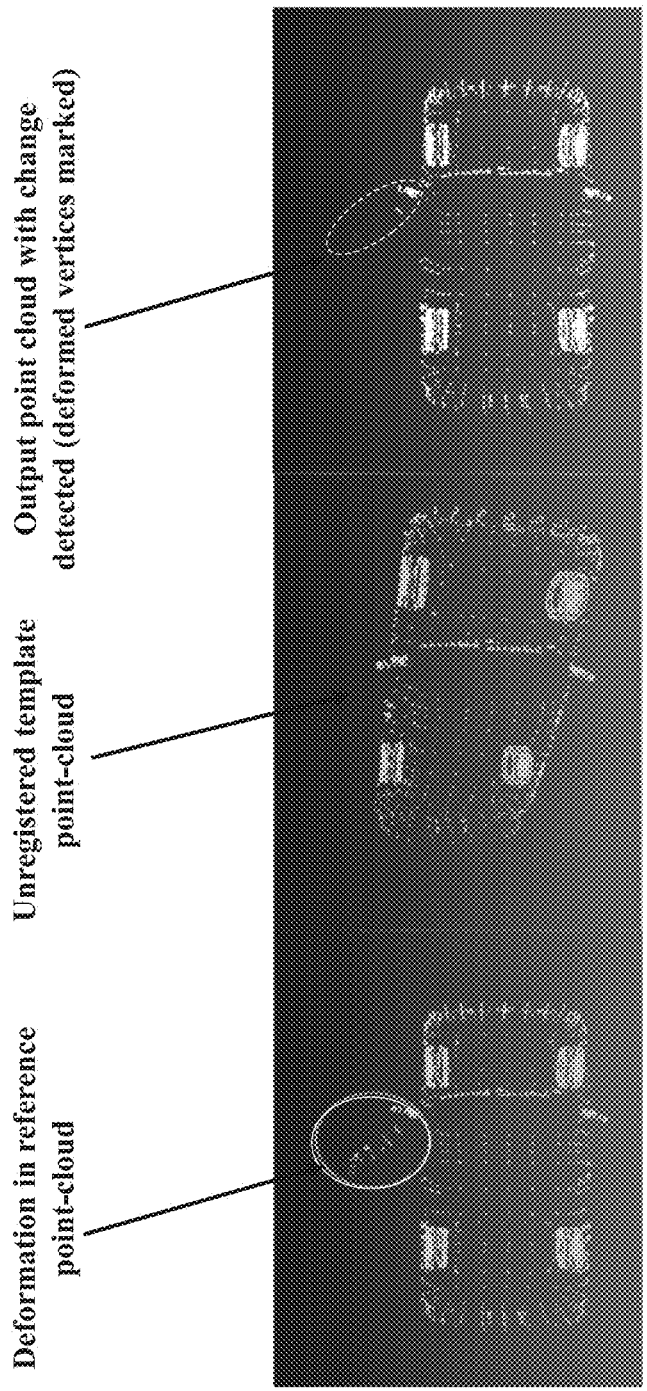

FIG. 4 and FIG. 5 are examples depicting changes detected with respect to the reference point-cloud and the template point-cloud acquired for example objects, in accordance with some embodiments of the present disclosure.

The method proposed is evaluated on a large diversity datasets. For example testing is performed on known dataset from with point-clouds of real scenes captured using Kinect® and 3D reconstructed point-cloud using Patch based Multi-View Stereo Software (PMVS). Experimental results, both qualitative and quantitative, show the efficacy of the method proposed in different conditions, with examples depicted in here in FIGS. 4 and 5 and further in conjunction with FIGS. 6 through 10.

Figure 6:
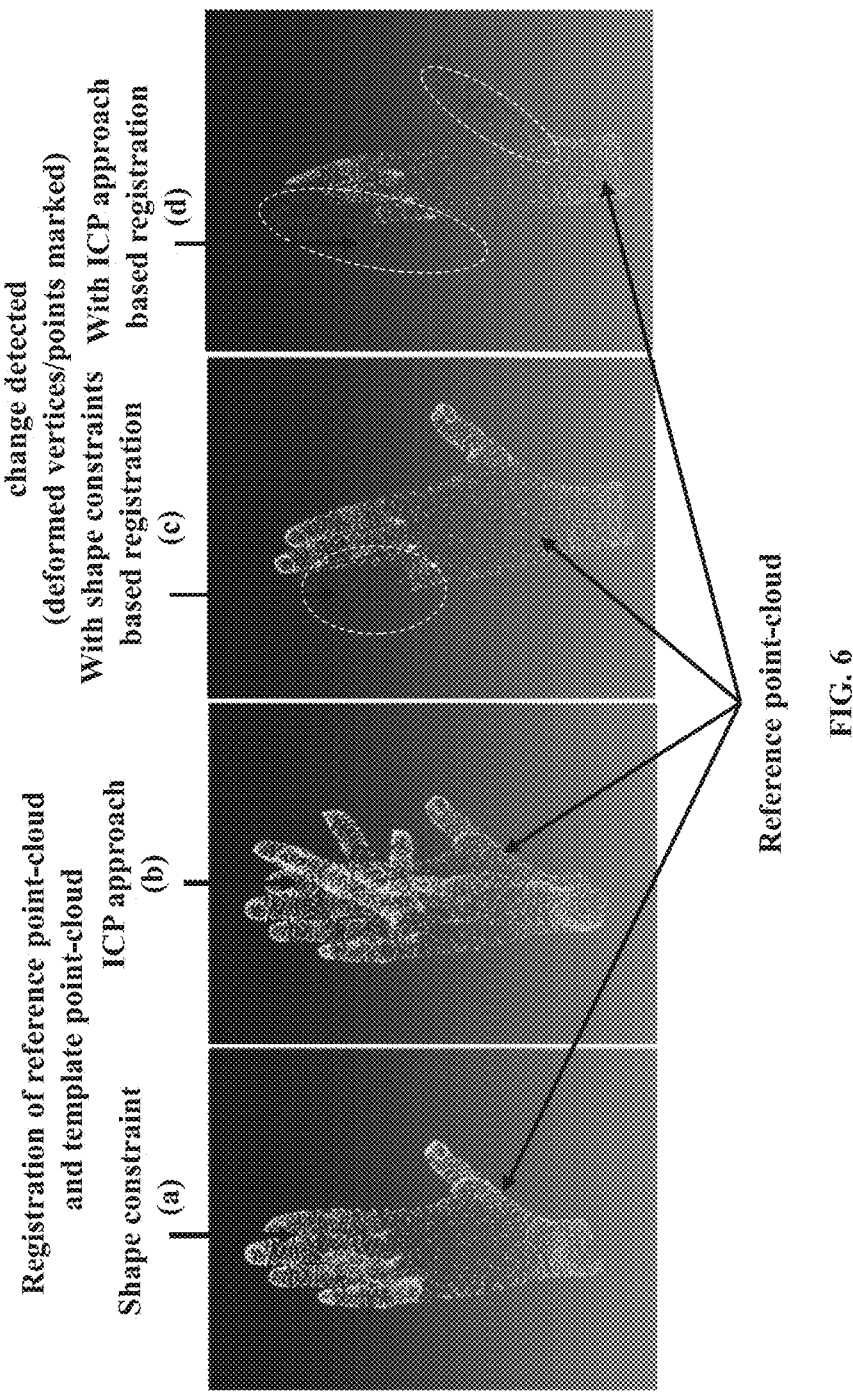
FIG. 6 illustrates examples providing comparison of change detection results wherein the change detection is performed using the surface fitting the reference point-clouds and the template point-clouds registered using different registration mechanisms, in accordance with some embodiments of the present disclosure.

In the FIGS. 4 and 5, change detection results are shown for different example datasets, wherein the input point-clouds are unregistered due to view point change. The datasets in FIG. 4 depicts hand movement whereas, the dataset of FIG. 5 depicts car deformation with movement. In these datasets there is no assumption on the point-cloud structure or deformation type. The results of the output point-clouds indicate that the method proposed provides equally good performance for unregistered point-clouds. FIG. 6 demonstrates the importance of correct registration for change detection. It can be observed that due to good alignment shown in FIG. 6(a) by the shape constraint based registration approach (described in FIG. 3a), the change detection is accurate in FIG. 6(c). For highly deformed template point-clouds, an existing Iterative Closet Point (ICP) based registration is unreliable as shown FIG. 6(b), hence, as shown in FIG. 6(d), is unable to guarantee precise change detection.

FIGS. 7a through 7d illustrate examples providing comparison of change detection results for varying resolution point-clouds acquired for objects or scenes of interest, in accordance with some embodiments of the present disclosure. The point-clouds shown in FIGS. 7a through 7d are captured using Microsoft Kinect®. The captured datasets are of varying resolution. The method performance equally good for all these cases in the presence of large diversity of deformation. The change of illumination does not affect the change depicted in output point-clouds and is not dependent on the availability of color in the point-cloud.

Figure 8:
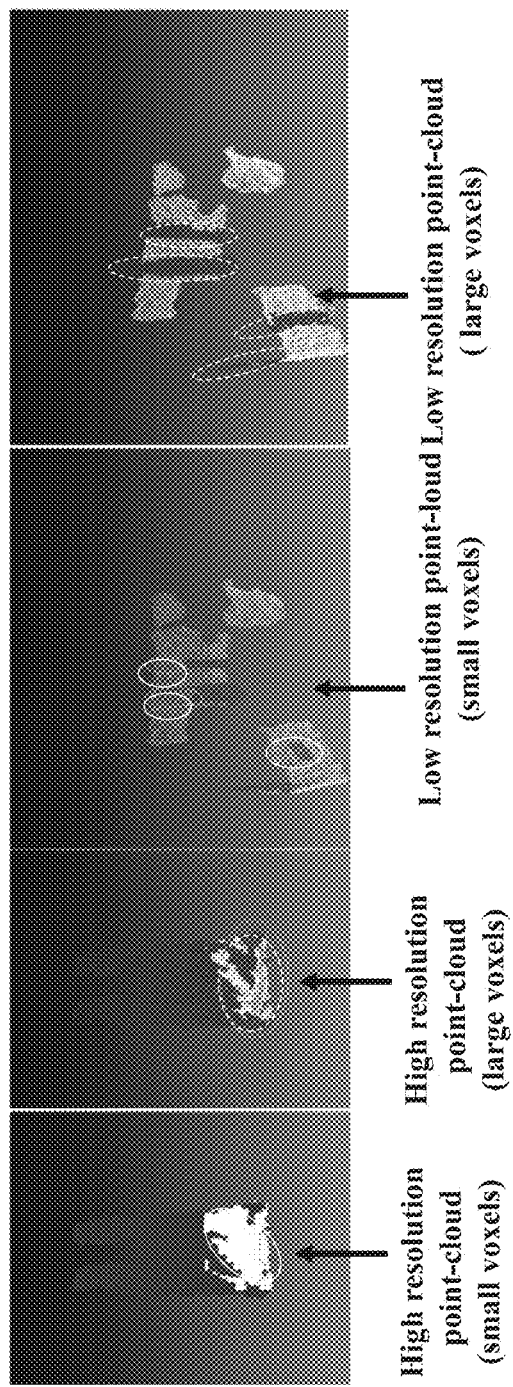
FIG. 8 illustrates examples providing comparison of change detection results for varying size of voxels applied on the reference point-clouds and the template point-clouds acquired for objects or scenes of interest, in accordance with some embodiments of the present disclosure.

FIG. 8 illustrates examples providing comparison of change detection results for varying size of voxels applied on the reference point-clouds and the template point-clouds acquired for objects or scenes of interest, in accordance with some embodiments of the present disclosure. The point-clouds shown in FIG. 8 are captured using Microsoft Kinect® and captured datasets are of varying resolution. As depicted, the method provides good performance for all these cases in the presence of large diversity of deformation. The change of illumination does not affect the outcome as the method disclosed is not dependent on the availability of color in the point-clouds.

Figure 9:
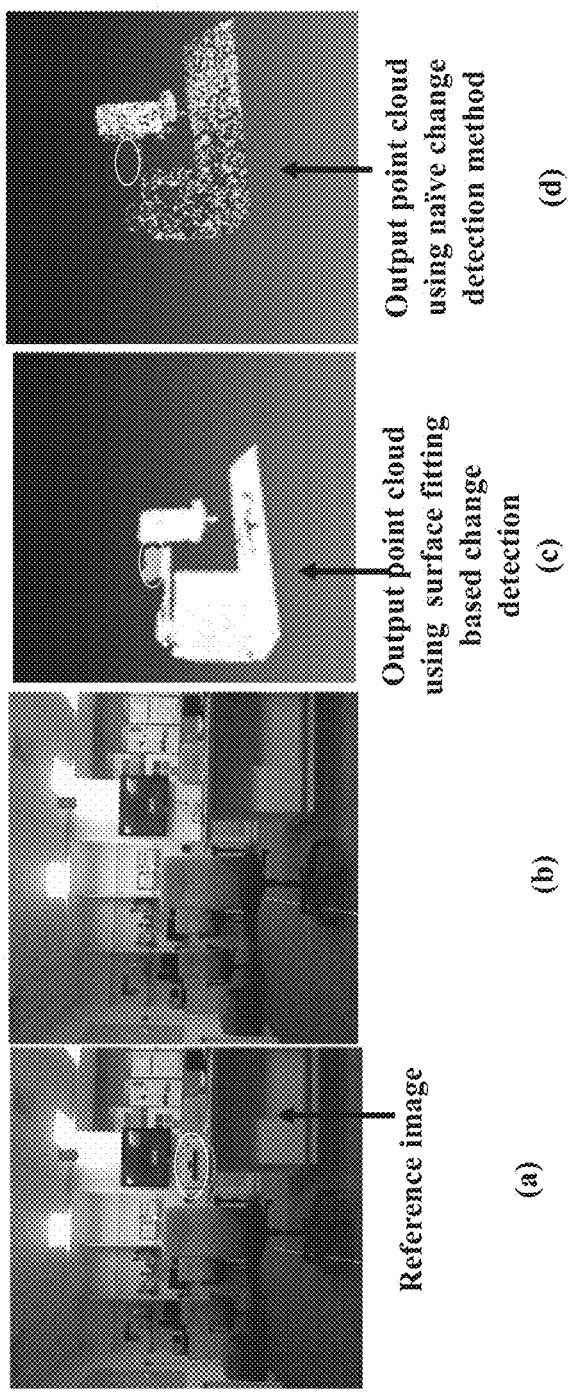
FIG. 9 illustrates examples providing comparison of change detection results using the surface fitting approach and a change detection approach that utilizes only positional information of the points in the point-cloud, in accordance with some embodiments of the present disclosure.

FIG. 9 illustrates examples providing comparison of change detection results using the surface fitting approach and a change detection approach that utilizes only positional information of the points in the point-cloud, in accordance with some embodiments of the present disclosure. The FIG. 9(c) is the change detection result obtained from the method as against FIG. 9(d) using naive based change detection, where change detection results are obtained only from vertex positions of the point-clouds. The result is imperfect in FIG. 9(d) due to detection of false positive vertices in the output. On the other hand, in FIG. 9(c) the deformation is clearly detected as it uses surface information of the point-cloud and remains invariant to the point-cloud density.

Figure 10:
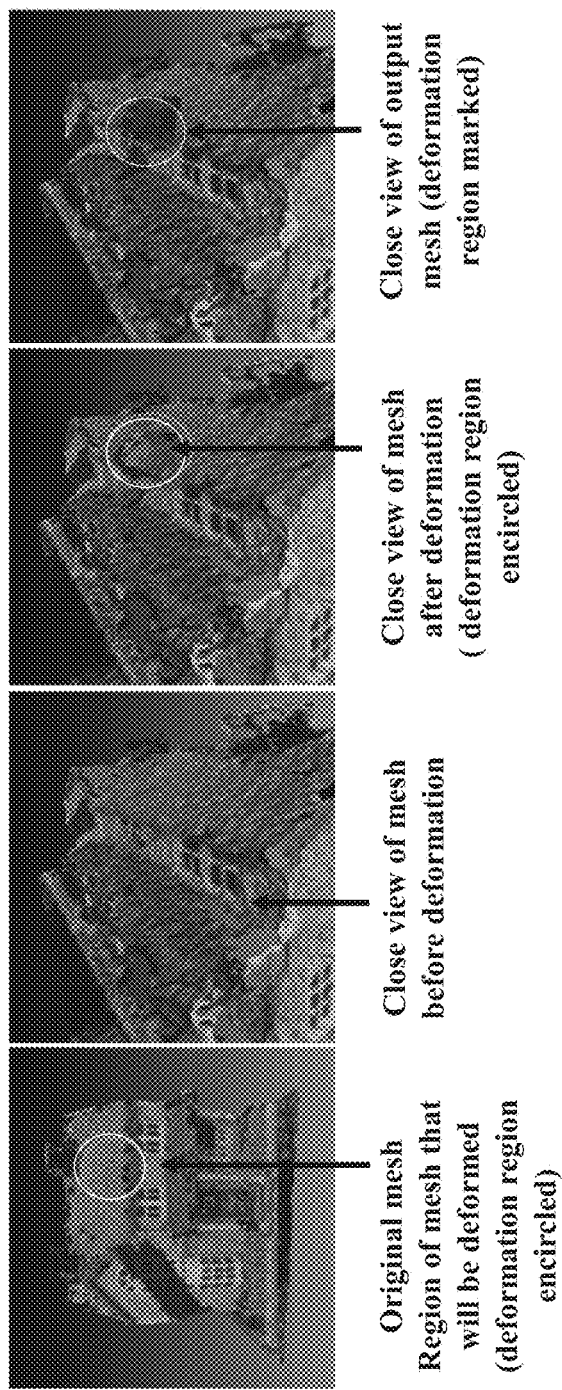
FIG. 10 illustrates example providing quantitative analysis of the method determining change detection using surface fitting approach, in accordance with some embodiments of the present disclosure.

FIG. 10 illustrates example providing quantitative analysis of the method determining change detection using surface fitting approach, in accordance with some embodiments of the present disclosure.

The quantitative evaluation of the method is carried out by estimating the amount of deformation and then comparing it with the Ground Truth (GT) providing the actual deformation at the scene. The analysis is performed using two metrics: (a) using the number of vertices in the deformed area and (b) using 3D bounding box. First, a part of the reference point-cloud is deformed using parametric function fun(x; y; z) such as elliptic paraboloid to generate the template point-cloud. The GT information such as, number of deformed point-cloud vertices and 3D bounding box volume of the deformed point-cloud region is generated for accuracy estimation. Then, the reference point-cloud and the template point-cloud are processed using the proposed system to detect the change in the point-cloud. According to the first metric, number of deformed vertices as estimated by surface fitting based approach is compared to the number of GT deformed vertices and percentage of deformation detected is generated. According to the second metric, 3D bounding box volume of detected deformed region is estimated following the surface fitting based change detection approach. Then, percentage ratio of the deformation detected is calculated by comparing the estimated volume to the GT volume. One of the datasets used to generate the quantification results is presented in the FIG. 10. The 3D structure of the house is reconstructed using the PMVS. The processing is done on the point-cloud of the house, and it is later converted into mesh for better visualization. Table 1, provides details on the quantitative analysis result. On average, using the method, with utilizing the surface fitting based approach for change detection a percentage accuracy of 84.86% using mesh vertices and 83.46% using 3D bounding box volume metrics respectively is achieved. The results signifies the effectiveness the method detecting the deformed vertices using surface information.

TABLE 1

| Dataset No | Deformation Detected (in %) | Using point-cloud vertices Using 3D bounding box |
|---|---|---|
| 1 | 82.8 | 81.4 |
| 2 | 87.5 | 85.2 |
| 3 | 84.3 | 83.8 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for change detection in a surface represented by 3D point-cloud, the method comprising:
    acquiring a reference point-cloud defining a reference surface and a template point-cloud defining a template surface, wherein the reference point-cloud and the template point-cloud correspond to the 3D point-cloud of the surface acquired at different time instances;
    aligning the template surface with the reference surface by performing registration of the template point-cloud and the reference point-cloud, wherein the registration of the reference point-cloud and the template point-cloud is based on shape similarity based constraints;
    equalizing point density of the registered reference point-cloud and the registered template point-cloud by performing subsampling to provide a processed reference point-cloud and a processed template point-cloud;
    reducing noise from the processed reference point-cloud and the processed template point-cloud by estimating a smooth reference surface and a smooth template surface using a locally weighted Moving Least Squares (MLS) approximation;
    voxelizing the smooth reference surface to generate a plurality of reference voxels and the smooth template surface to generate a plurality of template voxels, wherein each reference voxel is defined by a plurality of reference vertices and each template voxel is defined by a plurality of template vertices;
    determining a corresponding reference vertex for every template vertex of each template voxel using a k-dimensional (kd)-tree, wherein the kd-tree is set with the plurality of reference vertices of a reference voxel;
    determining vertex distance between every template vertex and the determined corresponding reference vertex, wherein the determined vertex distance above a predefined vertex distance threshold is indicative of the change in the surface represented by the 3D-point-cloud; and
    generating an output point-cloud indicating change detected in the template point-cloud with respect to the reference point-cloud.

2. The method of claim 1, wherein performing the sub-sampling to provide the processed reference point-cloud and the processed template point-cloud comprises:
    identifying a first point-cloud and a second point-cloud among the reference point-cloud and the template point-cloud for sub-sampling, wherein the first point-cloud comprises higher density of points and the second point-cloud comprises lower density of points;
    assigning a parameter to each point of the first point-cloud, wherein the parameter is initialized to zero value indicating that the point is not required to be sampled;
    setting each point of the first point-cloud in the kd-tree, wherein each point is defined by 3D-coordinates;

identifying a closest point from the first point-cloud for each point of the second point-cloud, wherein the closest point is identified from the kd-tree and is defined by 3D-coordinates;

determining a sub-sampling distance between the each point of the second point-cloud and the corresponding closest point from the first point-cloud; and generating a sub-sampled first point-cloud by retaining the closest point from the first point-cloud in the sub-sampled first point-cloud if the determined sub-sampling distance is below a threshold t1 or above a predefined subsampling threshold t2, wherein t2 is greater than t1.

3. The method of claim 1, wherein generating the smooth reference surface and the smooth template surface comprises:

estimating a local reference surface for each point of the processed reference point-cloud and a local template surface for each point of the processed template point-cloud, wherein estimating the local reference surface and the local template surface comprises:

identifying local neighborhood comprising a plurality of neighbor points for each point of the processed reference point-cloud and each point of the processed template point-cloud; and identifying a local reference planar surface represented by the corresponding plurality of neighbor points and a local template planar surface represented by the corresponding plurality of neighbor points, wherein the local reference planar surface and the local template planar surface is estimated such that the summation of the weighted distances between the plurality of neighbor points and projections of the plurality of neighbor points on the local reference surface and the local template surface is minimized;

projecting each point of the processed reference point-cloud on the corresponding local reference planar surface and each point of the processed template point-cloud on the corresponding local template planar surface, wherein each projected point from reference point-cloud is considered as origin of a local reference coordinate system and each projected point from template point-cloud is considered as origin of a local template coordinate system; and estimating, each of the local reference surface and the local template surface by a corresponding polynomial in two variables, wherein values of the variables represent coordinates of corresponding projected point in terms of the local reference system, wherein the corresponding polynomials approximate height of the plurality of neighbor points from the local reference planar surface and the local template planar surface by minimizing the differences between the actual height of the plurality of neighbor points from the local reference planar surface and the corresponding heights as approximated by the polynomial, wherein the projected points form a smoothened surface manifold and smoothening uses differential geometry that enables approximation of a local surface by a function.

4. A system (102) for change detection in a surface represented by 3D point-cloud, wherein the system comprises a memory (204) operatively coupled to one or more hardware processors (202) and configured to store instructions configured for execution by the one or more hardware processors (202), further the system comprises:

a registration module (212) is configured to:

acquire a reference point-cloud defining a reference surface and a template point-cloud defining a template surface, wherein the reference point-cloud and the template point-cloud correspond to the 3D point-cloud of the surface acquired at different time instances; and align the template surface with the reference surface by performing registration of the template point-cloud and the reference point-cloud, wherein the registration of the reference point-cloud and the template point-cloud is based on shape similarity based constraints;

a subsampling module (214) is configured to:

equalize point density of the registered reference point-cloud and the registered template point-cloud by performing subsampling to provide a processed reference point-cloud and a processed template point-cloud;

a change detection module (216) configured to:

reduce noise from the processed reference point-cloud and the processed template point-cloud by estimating a smooth reference surface and a smooth template surface using a locally weighted Moving Least Squares (MLS) approximation;

voxelize the smooth reference surface to generate a plurality of reference voxels and the smooth template surface to generate a plurality of template voxels, wherein each reference voxel is defined by a plurality of reference vertices and each template voxel is defined by a plurality of template vertices;

determine a corresponding reference vertex for every template vertex of each template voxel using a kd-tree, wherein the kd-tree is set with the plurality of reference vertices of a reference voxel; and determine vertex distance between every template vertex and the determined corresponding reference vertex, wherein the determined vertex distance above a predefined vertex distance threshold is indicative of the change in the surface represented by the 3D-point-cloud; and generate an output point-cloud indicating change detected in the template point-cloud with respect to the reference point-cloud.

5. The system (102) of claim 4, wherein, to perform the subsampling to provide the processed reference point-cloud and the processed template point-cloud, the subsampling module (214) is configured to:

identify a first point-cloud and a second point-cloud among the reference point-cloud and the template point-cloud for sub-sampling, wherein the first point-cloud comprises higher density of points and the second point-cloud comprises lower density of points;

assign a parameter to each point of the first point-cloud, wherein the parameter is initialized to zero value indicating that the point is not required to be sampled;

set each point of the first point-cloud in a k-dimensional (kd)-tree, wherein each point is defined by 3D-coordinates;

identify a closest point from the first point-cloud for each point of the second point-cloud, wherein the closest point is identified from the kd-tree and is defined by 3D-coordinates;

determine a sub-sampling distance between the each point of the second point-cloud and the corresponding closest point from the first point-cloud; and generate a sub-sampled first point-cloud by retaining the closest point from the first point-cloud in the subsampled first point-cloud if the determined sub-sampling distance is below a threshold t1 or above a predefined subsampling threshold t2, wherein t2 is greater than t1.

6. The system of claim 4, wherein to generate the smooth reference surface and the smooth template surface, the change detection module (216) is configured to:
    estimate a local reference surface for each point of the processed reference point-cloud and a local template surface for each point of the processed template point-cloud, by:
        identifying local neighborhood comprising a plurality of neighbor points for each point of the processed reference point-cloud and each point of the processed template point-cloud; and
        identifying a local reference planar surface represented by the corresponding plurality of neighbor points and a local template planar surface represented by the corresponding plurality of neighbor points, wherein the local reference planar surface and the local template planar surface is estimated such that the summation of the weighted distances between the plurality of neighbor points and projections of the plurality of neighbor points on the local reference surface and the local template surface is minimized;
    projecting each point of the processed reference point-cloud on the corresponding local reference planar surface and each point of the processed template point-cloud on the corresponding local template planar surface, wherein each projected point from the reference point-cloud is considered as origin of a local reference coordinate system and each projected point from the template point-cloud is considered as origin of a local template coordinate system; and
    estimating each of the local reference surface and the local template surface by a corresponding polynomial in two variables, wherein values of the variables represent coordinates of corresponding projected point in terms of the local reference system, wherein the corresponding polynomials approximate height of the plurality of neighbor points from the local reference planar surface and the local template planar surface by minimizing the differences between the actual height of the plurality of neighbor points from the local reference planar surface and the corresponding heights as approximated by the polynomial, wherein the projected points form a smoothened surface manifold and smoothening uses differential geometry that enables approximation of a local surface by a function.

7. A non-transitory computer-readable medium storing instructions, which, when executed by a hardware processor, cause the hardware processor to perform acts comprising:
    acquiring a reference point-cloud defining a reference surface and a template point-cloud defining a template surface, wherein the reference point-cloud and the template point-cloud correspond to a 3D point-cloud of a surface acquired at different time instances;
    aligning the template surface with the reference surface by performing registration of the template point-cloud and the reference point-cloud, wherein the registration of the reference point-cloud and the template point-cloud is based on shape similarity based constraints;
    equalizing point density of the registered reference point-cloud and the registered template point-cloud by performing subsampling to provide a processed reference point-cloud and a processed template point-cloud;
    reducing noise from the processed reference point-cloud and the processed template point-cloud by estimating a smooth reference surface and a smooth template surface using a locally weighted Moving Least Squares (MLS) approximation;
    voxelizing the smooth reference surface to generate a plurality of reference voxels and the smooth template surface to generate a plurality of template voxels, wherein each reference voxel is defined by a plurality of reference vertices and each template voxel is defined by a plurality of template vertices;
    determining a corresponding reference vertex for every template vertex of each template voxel using a kd-tree, wherein the kd-tree is set with the plurality of reference vertices of a reference voxel; and
    determining vertex distance between every template vertex and the determined corresponding reference vertex, wherein the determined vertex distance above a predefined vertex distance threshold is indicative of the change in the surface represented by the 3D-point-cloud; and
    generating an output point-cloud indicating change detected in the template point-cloud with respect to the reference point-cloud.

8. The non-transitory of claim 7, wherein the steps for performing the subsampling to provide the processed reference point-cloud and the processed template point-cloud comprise:
    identifying a first point-cloud and a second point-cloud among the reference point-cloud and the template point-cloud for sub-sampling, wherein the first point-cloud comprises higher density of points and the second point-cloud comprises lower density of points;
    assigning a parameter to each point of the first point-cloud, wherein the parameter is initialized to zero value indicating that the point is not required to be sampled;
    setting each point of the first point-cloud in the kd-tree, wherein each point is defined by 3D-coordinates;
    identifying a closest point from the first point-cloud for each point of the second point-cloud, wherein the closest point is identified from the kd-tree and is defined by 3D-coordinates;
    determining a sub-sampling distance between the each point of the second point-cloud and the corresponding closest point from the first point-cloud; and
    generating a sub-sampled first point-cloud by retaining the closest point from the first point-cloud in the sub-sampled first point-cloud if the determined sub-sampling distance is below a threshold t1 or above a predefined subsampling threshold t2, wherein t2 is greater than t1.

9. The non-transitory medium of claim 7, wherein the steps for generating the smooth reference surface and the smooth template surface comprise:
    estimating a local reference surface for each point of the processed reference point-cloud and a local template surface for each point of the processed template point-cloud, wherein estimating the local reference surface and the local template surface comprises:
        identifying local neighborhood comprising a plurality of neighbor points for each point of the processed reference point-cloud and each point of the processed template point-cloud; and
        identifying a local reference planar surface represented by the corresponding plurality of neighbor points and a local template planar surface represented by the corresponding plurality of neighbor points, wherein the local reference planar surface and the local template planar surface is estimated such that the summation of the weighted distances between the plurality of neighbor points and projections of the plurality of neighbor points on the local reference surface and the local template surface is minimized;

projecting each point of the processed reference point-cloud on the corresponding local reference planar surface and each point of the processed template point-cloud on the corresponding local template planar surface, wherein each projected point from reference point-cloud is considered as origin of a local reference coordinate system and each projected point from template point-cloud is considered as origin of a local template coordinate system; and estimating each of the local reference surface and the local template surface by a corresponding polynomial in two variables, wherein values of the two variables represent coordinates of corresponding projected point in terms of the local reference system, wherein the corresponding polynomials approximate height of the plurality of neighbor points from the local reference planar surface and the local template planar surface by minimizing the differences between the actual height of the plurality of neighbor points from the local reference planar surface and the corresponding heights as approximated by the polynomial, wherein the projected points form a smoothened surface manifold and smoothening uses differential geometry that enables approximation of a local surface by a function.

* * * * *